United States Patent [19]

Becht et al.

[11] 4,330,996
[45] May 25, 1982

[54] VACUUM BRAKE BOOSTER

[75] Inventors: Reimund Becht, Frankfurt-Höchst; Peter Böhm, Frankfurt am Main, both of Fed. Rep. of Germany

[73] Assignee: ITT Industries, Inc., New York, N.Y.

[21] Appl. No.: 141,829

[22] Filed: Apr. 21, 1980

[30] Foreign Application Priority Data

May 10, 1979 [DE] Fed. Rep. of Germany ....... 2918914

[51] Int. Cl.³ .............................................. F15B 7/00
[52] U.S. Cl. ................................. 60/581; 91/376 R; 91/533; 92/48
[58] Field of Search .................. 92/48, 98 D, 165 PR, 92/166; 60/547 R, 581; 91/376 R, 533

[56] References Cited

U.S. PATENT DOCUMENTS

| 3,321,915 | 5/1967 | Martin | 92/117 R |
|---|---|---|---|
| 4,020,749 | 5/1977 | Müller | 92/48 |
| 4,256,016 | 3/1981 | Thomas | 91/376 R |

FOREIGN PATENT DOCUMENTS 2845794 4/1979 Fed. Rep. of Germany ... 91/369 A

OTHER PUBLICATIONS

Girling Lightweight Car Brake Actuation Equipment, Lucas Girling, 1-8-79, p. 6.

*Primary Examiner*—Abraham Hershkovitz
*Attorney, Agent, or Firm*—John T. O'Halloran; Alfred C. Hill

[57] ABSTRACT

The brake booster comprises two booster units in a tandem arrangement each having a movable wall. A stationary partition is provided between the two movable walls. In order to increase the axial stiffness of the booster casing, the partition is provided with bolt projections extending in both directions therefrom and are rigidly connected to the appropriate end walls of the casing. The ends of the bolt projections at the end walls form anchor means for connecting the booster to a master brake cylinder and to a supporting surface of a motor vehicle.

26 Claims, 3 Drawing Figures

VACUUM BRAKE BOOSTER

BACKGROUND OF THE INVENTION

The present invention relates to a brake booster for a motor vehicle with two booster units each of which includes a vacuum chamber and a working chamber disposed in a casing and provided with a common partition wall. In each of these booster units the pressure difference between the vacuum and the pressure, which is controllable by a valve, in the associated working chamber works on a movable wall, which separates the vacuum chamber and the working chamber, and is transmitted by mechanical elements onto a force transmission element which combines the forces proportional to the pressure difference with the force acting on the brake pedal for transmission onto the master brake cylinder.

Such brake boosters are known for motor vehicles in which an additional force is generated from the pressure difference between a vacuum and the atmospheric pressure. The brake booster comprises a vacuum casing, a movable wall arranged therein, and a control valve. The vacuum casing is of a tubular design and the two end walls serve for fastening. Usually, the brake booster will be fastened to the splash wall in the motor vehicle by means of one end wall where the control valve is provided while at the other end wall of the vacuum casing the master brake cylinder is fastened. The inside of the vacuum casing is divided by the movable wall into a vacuum chamber with a constant vacuum and into a working chamber.

The pressure in the working chamber may reach different values dependent on the control valve operated via the brake pedal. The force which will become effective on the movable wall if there is a pressure difference will be transmitted onto the master brake cylinder via a push rod axially disposed in the vacuum casing along with the pedal force acting on the push rod via the control valve.

The vacuum casing is usually of sheet steel. The pressure difference between the atmospheric pressure prevailing outside the vacuum casing and the vacuum will generate forces which will lead to a deformation of the vacuum casing. In addition to the pressure-difference-originated forces there will be those forces that will be transmitted via the push rod during brake actuation, i.e. the brake pedal force and the boosting force generated by the brake booster. The resultant force will act on the piston of the master cylinder and generate a reaction force in the master cylinder which, while opposed to the total force, will equal it.

The pedal-force-originated constituent of the reaction force will be transmitted from the master cylinder via the steel parts of the vacuum casing to the splash wall where the brake pedal is fastened. The boosting-force-originated constituent of the reaction force will stop at the vacuum casing. The consequence of the reaction force being transmitted via the vacuum casing will be that the vacuum casing will be extended axially upon actuation of the brake. Thus, the master cylinder is displaced which will require an additional lost travel of the brake pedal. Due to the transmission ratio of the brake lever, the extension of the vacuum casing will be transmitted to the brake pedal, boosted up considerably.

The German patent DE-OS No. 2,830,262, issued Jan. 1, 1980 suggests providing at least two rods connected with the end walls of the vacuum casing substantially parallel to the push rod and penetrating the movable wall. The movable wall is slidably arranged on the rods by means of slide seals.

SUMMARY OF THE INVENTION

It is an object of the present invention to improve the construction of the brake booster of the above-cited German Patent so as to achieve a reduction of the constructional length, possibly accompanied by a further reduction in weight, and a simplified structure enabling an easier assembly while safeguarding the operating ability and safety.

A feature of the present invention is the provision of a brake booster for a motor vehicle comprising: a vacuum casing having a longitudinal axis; two booster units disposed in the casing coaxial of the axis in a tandem relationship, each of the booster units including a vacuum chamber, a working chamber and a movable wall therebetween, the movable wall being moved by a pressure difference between the vacuum chamber and the working chamber, the pressure difference being controllable by a control valve common to the booster units, the control valve being controlled by a brake pedal and including a force transmitting means which combines a brake pedal force and a force proportional to the pressure difference for transmission to a master brake cylinder; and a partition wall disposed in said casing coaxial of the axis separating the booster units, the partition wall being employed to fasten the booster to the vehicle and to fasten the master brake cylinder to the booster.

Thus, the brake booster of the present invention is constructed around this partition wall.

According to further characteristics of the invention there are provided rods at this supporting element for securing the brake booster to the motor vehicle, which penetrate the pedal side booster unit, and which are sealed relative to the penetrated walls by means of seals, such as, e.g., rolling diaphragms.

The master brake cylinder side booster unit may preferably be designed to have a cylindrically shaped space in the very center thereof for the reception of the master brake cylinder. In this case, the master brake cylinder will be directly secured by means of bolts at the supporting wall.

It is, however, also possible to secure the master brake cylinder by means of rods which will penetrate the master brake cylinder side booster unit and which will be sealed relative to the penetrated walls by means of seals. The master brake cylinder may be secured with its adjacent end wall at the rods. It is, however, also possible to arrange the flange for fastening on the master brake cylinder in such an axially staggered manner that the master brake cylinder will partially project into the master brake cylinder side booster unit.

The two movable walls may be connected with each other by means of connecting rods which have to be sealed relative to the partition wall by means of seals.

It is possible to provide bores in the fastening rods and in the connecting rods in order to connect the two working chambers or the two vacuum chambers with each other.

According to a further characteristic of the invention it is expedient to connect the two movable walls with each other by means of a centrally arranged tube which is also connected with the casing of the control valve.

The connection of the two vacuum chambers is brought about via the interior space of this connecting tube.

It is further expedient to provide tubular projections at the supporting element which extends up to the brake-pedal side end wall and/or to the master-brake-cylinder side end wall. In such an embodiment, the master brake cylinder may be fastened at this tubular projection, the inside of the tubular projection receiving the front part of the master brake cylinder. If the tubular projection extends up to the brake-pedal side end wall, it is possible to connect the brake booster with the splash wall of the motor vehicle via this projection.

According to a further characteristic of the invention, for the purpose of reducing the total constructional length of the brake booster and master brake cylinder, only one common return spring is provided in the brake booster itself. Thus, the return spring usually provided in the master brake cylinder will be eliminated.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
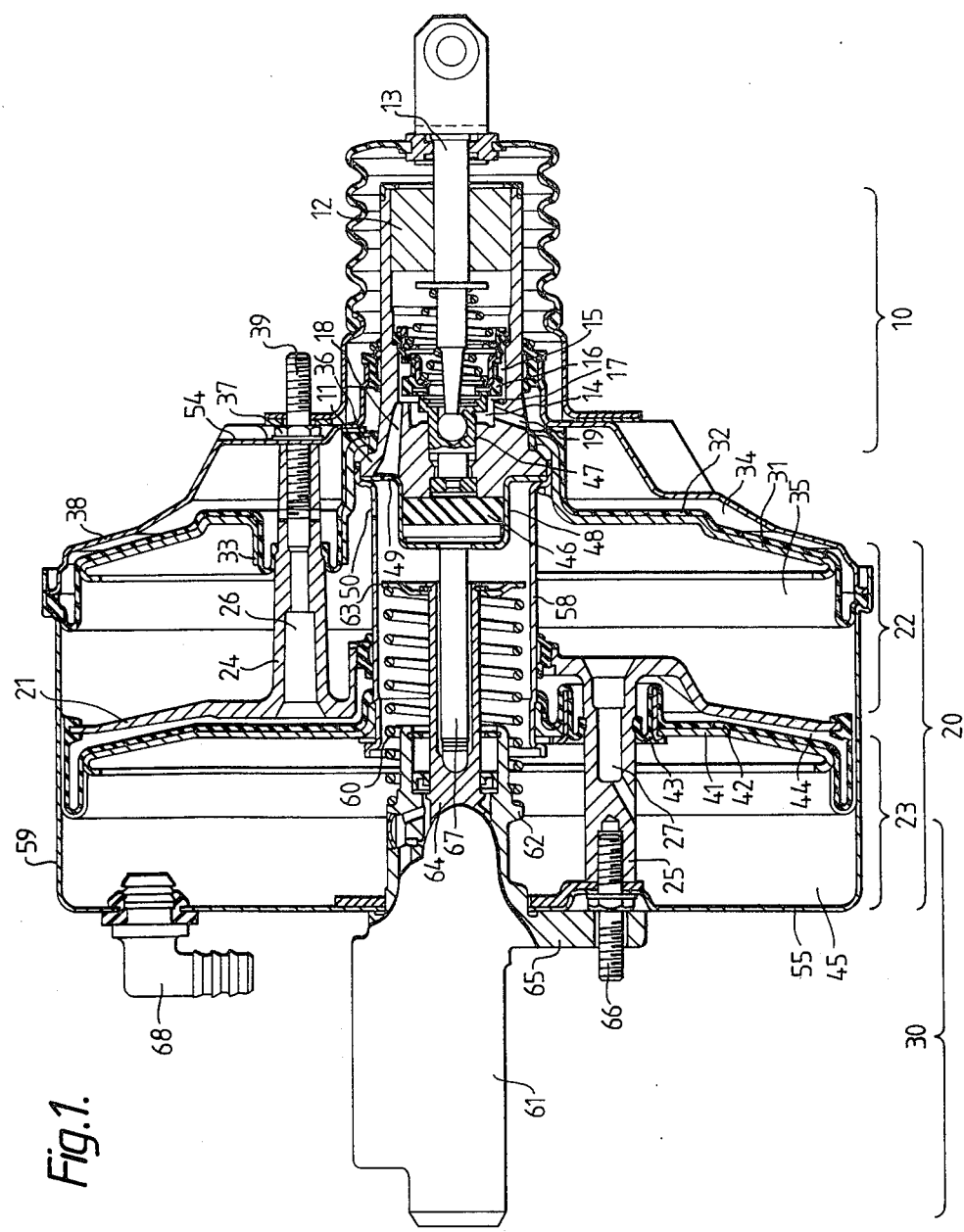
FIG. 1 is a longitudinal cross sectional view of a first embodiment of a brake booster in accordance with the principles of the present invention having fastening rods extending to the pedal side end wall of the vacuum casing and to the master-brake-cylinder side end wall of the vacuum casing.

An embodiment of the inventive brake booster illustrated in FIG. 1 comprises three structural groups, i.e., valve 10, the actual brake booster 20, and the master brake cylinder 30. Brake booster 20 comprises two booster units 22 and 23, both being controlled by valve 10 and, thus, working in parallel.

In the valve casing 11 two channels are provided, the working chamber channel 19 connecting the first annular chamber 14 of the valve with the working chamber 34 and the vacuum chamber channel 18 connecting the second annular chamber 15 with the vacuum chamber 35. In the rest position of the brake pedal, and, hence, of the valve 10, the two annular chambers 14 and 15 will communicate with each other. The same applies to vacuum chamber 35 and working chamber 34. Thus, in the rest position the pressure is the same in the two chambers 34 and 35. Upon actuation of the brake pedal, the push rod 13 will cause the valve to be displaced to the left. As soon as the sealing ring 16 comes to rest on the valve seat, the two annular chambers 14 and 15 will be separated. Upon a further displacement of push rod 13 to the left, the valve 17 will open, thus, allowing air to enter the first annular chamber 14 and, hence, working chamber 34 from the outside via the air filter 12. Upon release of the brake pedal, at first valve 17 will close and sealing ring 16 lifts off the valve seat so as to enable vacuum chamber 35 to communicate with working chamber 34 again and to have the same pressure in these two chambers again.

The first booster unit 22 includes working chamber 34 and vacuum chamber 35. The two chambers are separated by a movable wall which includes the diaphragm plate 31 and the rolling diaphragm 32. The inner edge 36 of the diaphragm plate 31 is designed so as to support itself at valve casing 11 and to transmit the forces that are transmitted to it on to valve casing 11. The partition wall 21 is provided with rods 24 penetrating the first booster unit 22 and fastened by means of bolts 37 at the cover 38 which also provides the pedal side end wall 54 of the vacuum casing. Additionally, bolts 39 connect the brake booster to the motor vehicle. Rods 24 are sealed by small rolling diaphragms 33 so as to prevent a pressure leak in the movable wall. Rods 24 contain bores 26 which establish a communication between working chamber 34 of the first booster unit 22 and the working chamber 44 of the second booster unit 23.

The second booster unit 23 includes working chamber 44 and the vacuum chamber 45. These two chambers are separated by the movable wall which includes the diaphragm plate 41 and the rolling diaphragm 42. Diaphragm plate 41 is fastened at a central tube 58 which is fastened at valve casing 11 together with diaphragm plate 31 of the first booster unit 22. The second booster unit 23 is penetrated by rods 25 at which rods the master brake cylinder 30 is secured. The rods 25 may likewise have bores 27 which establish a communication between vacuum chamber 35 and vacuum chamber 45. The movable wall is sealed relative to rods 25 by means of a rolling diaphragm 43 so as to prevent any pressure leak from one chamber to the other.

Valve casing 11 and the pressure member 47 acted upon by push rod 13 will act on the rubber disk 46 which will add up the two forces, i.e., the pedal force and the boosting force, and transmit them to the piston 64 of the master brake cylinder 30 via the rod 67. A return spring 60 is provided between a projection 62 of the master brake cylinder casing 61 and a spring plate 63. Spring plate 63 is fastened at the extended end of piston 64. Spring 60 is the common return spring of brake booster 20 and master brake cylinder 30. Thus, this construction saves one spring.

Rod 67 is held by a sheet metal plate 48 which, together with tube 58 and diaphragm plate 31, is fastened at valve casing 11. Vacuum chamber channel 18 communicates with vacuum chamber 35 via a bore 49 in sheet metal plate 48 and via a bore 50 in tube 58. Vacuum chamber channel 18 also communicates with vacuum chamber 45 via bore 49 and the inside of tube 58. The communication via bores 27 in rods 25 will then only be needed if a communication via tube 58 proves impossible. Further, vacuum chambers 45 and 35 may also communicate with each other via openings provided at the point where partition wall 21 is secured to casing 59.

It should be further pointed out that, for the purpose of reducing the constructional length of the brake booster, the ends of rods 24 and 25 fastened at partition wall 21 are axially staggered with respect of each other. Rods 24 and 25, each of them being provided at least twice, are evenly distributed over a circle. The illustrated embodiment shows a section in two planes lying at 90 degrees relative to each other. Thus, the position of rod 24 as well as that of rod 25 becomes visible. The vacuum will be brought about by air being sucked off via opening 50, the inside of tube 58 and outlet 68.

Master brake cylinder 30 is fastened at the bolts 66 via the flange 65 which is situated at about the center or within the first third of the master brake cylinder casing 61.

Figure 2:
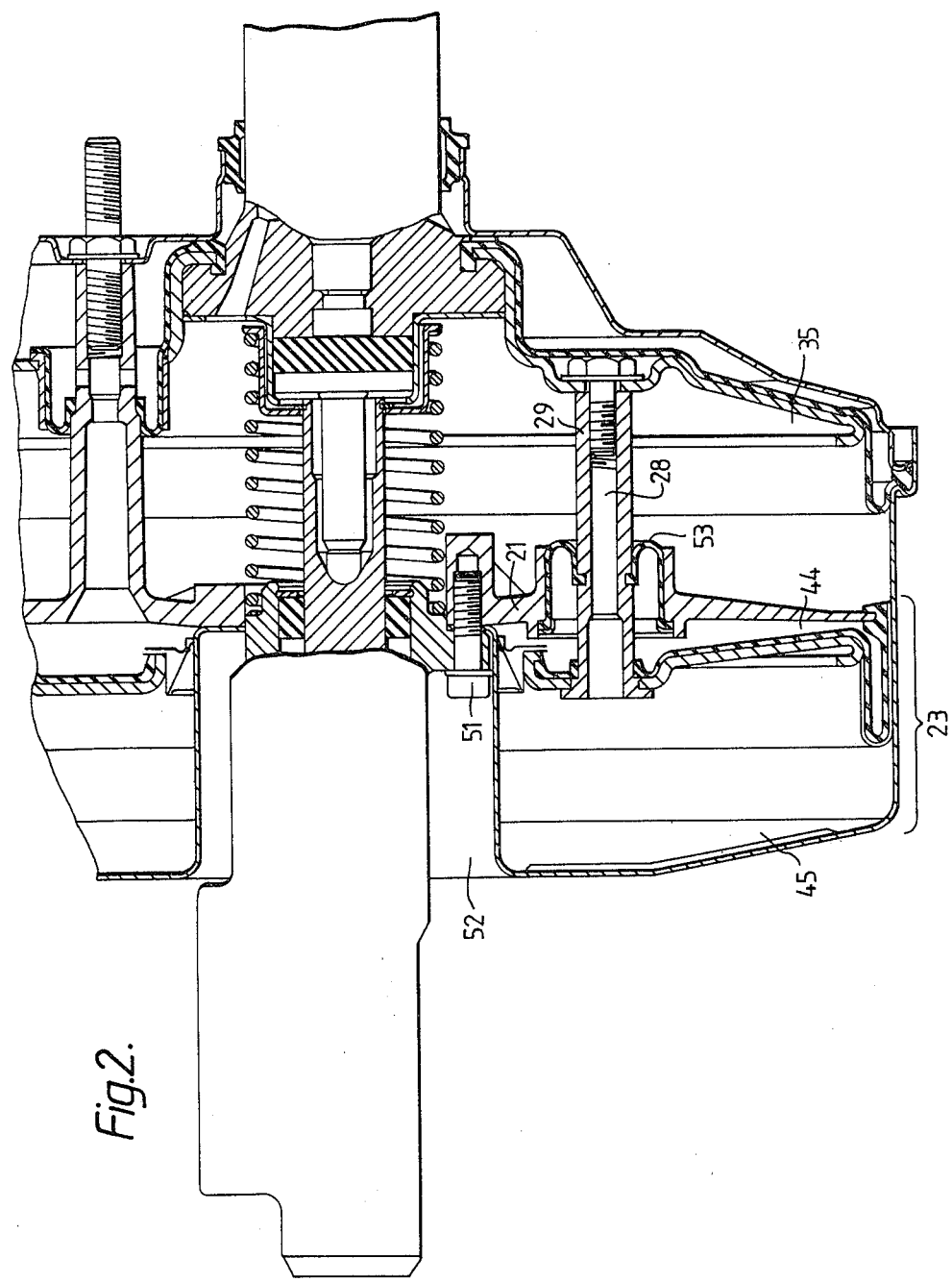
FIG. 2 is a partial longitudinal cross sectional view of a second embodiment of a brake booster in accordance with the principles of the present invention having rods extending to the pedal side end wall of the vacuum casing and fastening bolts fastened at the partition wall for fastening the master brake cylinder thereto.

FIG. 2 illustrates another embodiment of the invention. Here there is a central free space 52 provided in the second booster unit 23. The free space is able to partially receive the master brake cylinder. The master brake cylinder will be directly fastened at partition wall 21 by means of the bolts 51. In this embodiment the two movable walls are connected with each other by means of connecting rods 29, which may contain bores 28 for communication between the two vacuum chambers 35 and 45. At the points of penetration of connecting rods 28 through partition wall 21 there are provided rolling diaphragms 53 in each case. Thus, the vacuum chamber 45 is sealed relative to working chamber 44.

Figure 3:
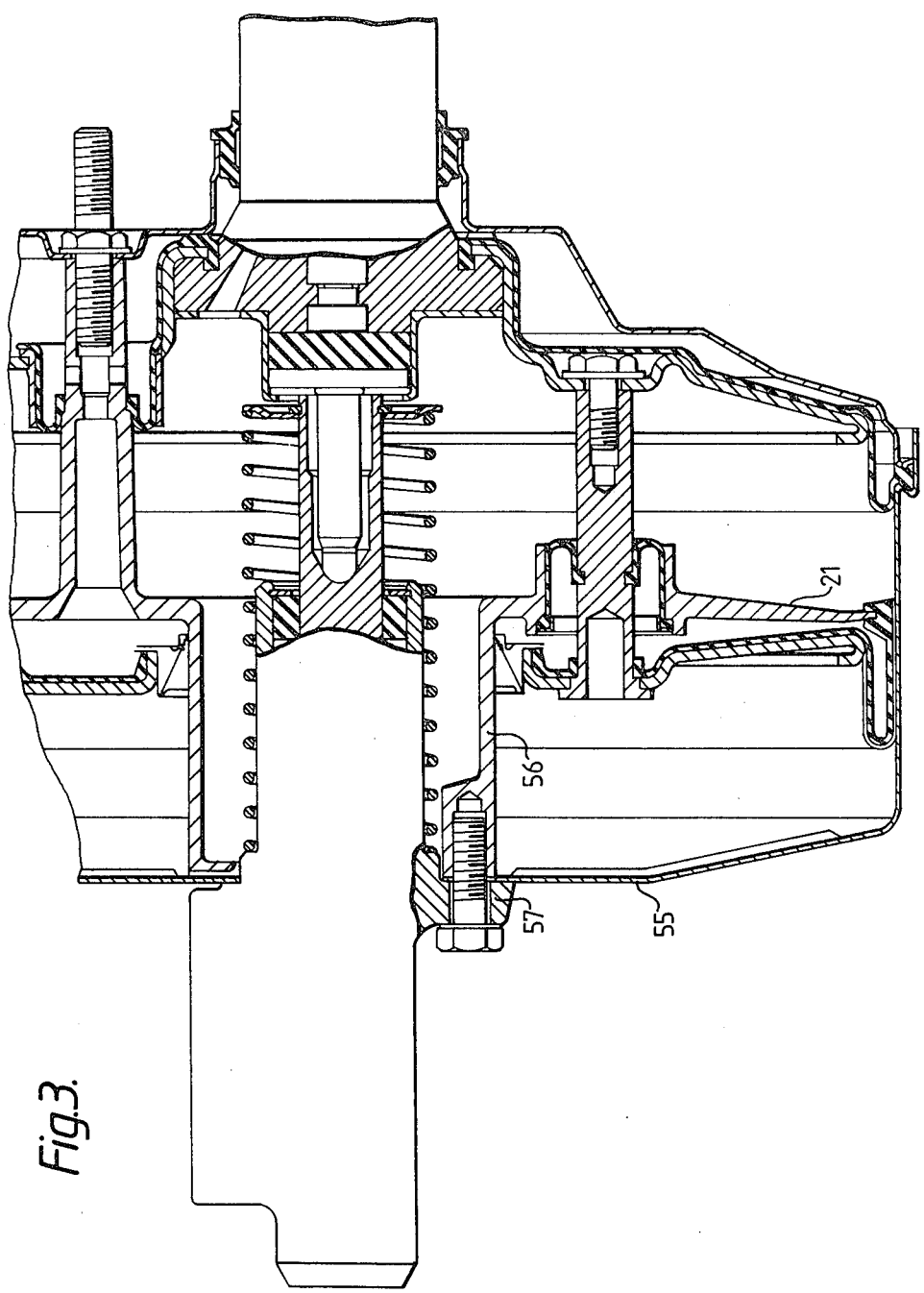
FIG. 3 illustrates a variation of FIG. 2 in which in place of the fastening bolts a tubular projection is directly provided at the partition wall extending up to the end wall of the vacuum casing adjacent the master brake cylinder.

FIG. 3 shows a further embodiment where a tubular projection 56 of partition wall 21 is provided which extends up to the master-brake-cylinder end wall 55. In this arrangement, just as in the arrangement according to FIG. 1, the master brake cylinder may be bolted onto tubular projection 56, the flange 57 being situated at about the first third up to one half of the master brake cylinder casing.

While we have described above the principles of our invention in connection with specific apparatus it is to be clearly understood that this description is made only by way of example and not as a limitation to the scope of our invention as set forth in the objects thereof and in the accompanying claims.

We claim:
1. A brake booster for a motor vehicle comprising:
a vacuum casing having a longitudinal axis;
two booster units disposed in said casing coaxial of said axis in a tandem relationship, each of said booster units including a vacuum chamber, a working chamber and a movable wall therebetween, said movable wall being moved by a pressure difference between said vacuum chamber and said working chamber, said pressure difference being controllable by a control valve common to said booster units, said control valve being controlled by a brake pedal and including a force transmitting means which combines a brake pedal force and a force proportional to said pressure difference for transmission to a master brake cylinder; and
a partition wall disposed in said casing coaxial of said axis separating said axis separating said booster units, said partition wall having first means to fasten said booster to said vehicle and second means to fasten said master brake cylinder to said booster, said first means being staggered with respect to said second means about said axis to provide a cooperative structural relationship with said partition wall to reduce the axial length of said booster and to stiffen said partition wall to enable said partition wall to transmit said forces without deformation thereof.

2. A booster according to claim 1, wherein
said first means includes first rods exending therefrom parallel to said axis to enable said booster to be fastened to said vehicle.

3. A booster according to claim 2, wherein
said first rods penetrate one of said booster units including one of said movable walls disposed therein, said one of said booster units being disposed between said partition wall and said vehicle.

4. A booster according to claim 3, wherein
said first rods are sealed to said movable walls by a first rolling diaphragm enabling relative motion between said first rods and said one of said movable walls.

5. A booster according to claim 4, wherein
said first rods include bores to enable communication between said two working chambers.

6. A booster according to claim 5, wherein
said second means includes second rods extending therefrom parallel to said axis to enable said master brake cylinder to be fastened to said booster.

7. A booster according to claim 6, wherein
said second rods penetrate the other of said booster units including the other of said movable walls disposed therein, said other of said booster units being disposed between said partition wall and said master brake cylinder.

8. A booster according to claim 7, wherein
said second rods are sealed to said other of said movable walls by a second rolling diaphragm enabling relative motion between said second rods and said other of said movable walls.

9. A booster according to claim 8, wherein
said second rods include bores to enable communication between said two vacuum chambers.

10. A booster according to claim 1, wherein
said second means includes rods extending therefrom parallel to said axis to enable said master brake cylinder to be fastened to said booster.

11. A booster according to claim 10, wherein
said rods penetrate one of said booster units including one of said movable walls disposed therein, said one of said booster units being disposed between said partition wall and said master brake cylinder.

12. A booster according to claim 11, wherein
said rods are sealed to said one of said movable walls by a rolling diaphragm enabling relative motion between said rods and said one of said movable walls.

13. A booster according to claim 12, wherein
said rods include bores to enable communication between said two vacuum chambers.

14. A booster according to claim 1, wherein
said master brake cylinder is fastened to said second means by bolts.

15. A booster according to claim 14, wherein
the end wall of said casing adjacent one of said booster units has a hollow cylindrical space extending up to said partition wall to receive said master brake cylinder.

16. A booster according to claim 1, wherein
said two movable walls are connected to each other by rods disposed parallel to said axis and penetrating said partition wall, and
rolling diaphragms are provided at the point said rods penetrate said partition wall to provide a seal therebetween and to enable relative motion therebetween.

17. A booster according to claim 16, wherein
said rods include bores to enable communication between said two vacuum chambers.

18. A booster according to claim 1, wherein said first means includes a tubular projection extending therefrom up to the end wall of said casing adjacent said vehicle, and
said booster is fastened to said vehicle by means of said tubular projection.

19. A booster according to claim 1, wherein
said second means includes a tubular projection extending therefrom up to the end wall of said casing adjacent said master brake cylinder, and
said master brake cylinder is fastened to said booster by means of said tubular projection.

20. A booster according to claim 19, wherein
said tubular projection receives therein a portion of said master brake cylinder, and
a flange of said master brake cylinder for fastening said master brake cylinder to said booster is appropriately positioned axially along said master brake cylinder.

21. A booster according to claim 1, wherein
said two movable walls are connected to each other by a tube concentrically disposed about said axis.

22. A booster according to claim 21, wherein
one end of said tube is fastened to a housing for said control valve.

23. A booster according to claim 22, wherein
said two vacuum chambers communicate with each other via said tube.

24. A booster according to claim 1, wherein
said two vacuum chambers communicate with each other via openings provided at a point of connection between said partition wall and said casing.

25. A booster according to claim 1, further including
a single return spring disposed in said casing to operate as a return spring for said two movable walls and a return spring for a master brake cylinder piston.

26. A booster according to claim 25, wherein
said single return is disposed between the housing of said master brake cylinder and a spring plate attached to an extension of said master brake cylinder piston.

* * * * *